Sept. 16, 1969 J. BUHR 3,467,873

A.F.C. DEFEAT NETWORKS FOR SIGNAL SEEKING RECEIVERS

Filed Dec. 19, 1966

INVENTOR.
JACOB BUHR

BY

PATENT AGENT

United States Patent Office 3,467,873
Patented Sept. 16, 1969

3,467,873

A.F.C. DEFEAT NETWORKS FOR SIGNAL SEEKING RECEIVERS

Jacob Buhr, Kitchener, Ontario, Canada, assignor to Electrohome Limited, Kitchener, Ontario, Canada Filed Dec. 19, 1966, Ser. No. 602,939
Int. Cl. H04b *1/06, 1/32*
U.S. Cl. 325—471 10 Claims

ABSTRACT OF THE DISCLOSURE

A signal seeking receiver has a first transistor that is automatically turned off when the tuner motor of the receiver is not running and on when this motor is operating. An A.F.C. defeat network automatically renders the A.F.C. network of the receiver inoperative when the first transistor is on and operative when the first transistor is off. The A.F.C. defeat network includes a second transistor which, when turned on, substantially short circuits the A.F.C. signals. The second transistor is normally biased on but is connected to the first transistor in such a manner that it is biased off when the first transistor is turned off.

This invention relates to radio receivers of the signal seeking type. More particularly, this invention relates to networks for automatically rendering the A.F.C. circuit of the receiver inoperative while signal seeking is taking place.

When the motor of a signal seeking receiver is operating, so that signal seeking is taking place, it is desirable for the A.F.C. circuit of the receiver to be defeated automatically, i.e., rendered inoperative, since this permits closer tuning to be obtained than would be possible if the A.F.C. were not defeated. In accordance with this invention, a relatively simple and inexpensive transistor circuit is provided for accomplishing the foregoing objective.

A signal seeking receiver embodying this invention is of a type that has an A.F.C. network including means for providing an A.F.C. signal, a terminal at which the A.F.C. signal appears, a local oscillator including a frequency determining component, and means connecting the terminal and the frequency determining component for supplying the A.F.C. signal to the latter to vary the impedance thereof and hence the frequency of oscillation of the local oscillator. The receiver also includes variable tuning means for varying the tuning of the receiver, a motor drivingly connected thereto, whereby the tuning of the receiver can be changed by operation of the motor, a first transistor having base, collector and emitter electrodes, and means for automatically turning the first transistor off when the receiver is tuned to the frequency of a signal being received by the receiver and of a strength greater than a minimum predetermined signal strength and on during signal seeking. In accordance with this invention, such a receiver is provided with an A.F.C. defeat network including a second transistor, means connecting the collector and emitter electrodes of the second transistor in a circuit adapted to substantially short circuit said A.F.C. signal when said second transistor is turned on and means for supplying a first bias voltage to the second transistor to turn on the second transistor. In addition, means are provided interconnecting the two transistors for supplying a second bias voltage to the second transistor when the first transistor is turned off, this second bias voltage being sufficient to override the first bias voltage and turn off the second transistor. The D.C. impedance of the aforementioned circuit is sufficiently low when the second transistor is tturned on that said A.F.C. signal is substantially short circuited but is of substantially higher D.C. impedance when said second transistor is turned off.

Figure 1:
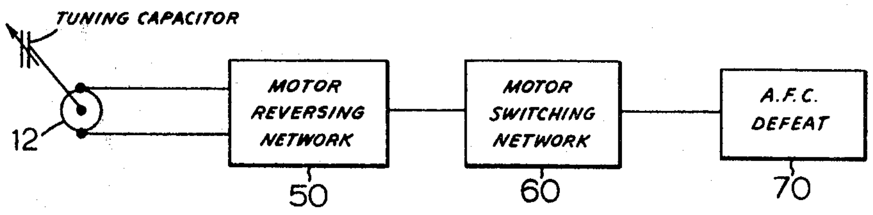
Figure 2:
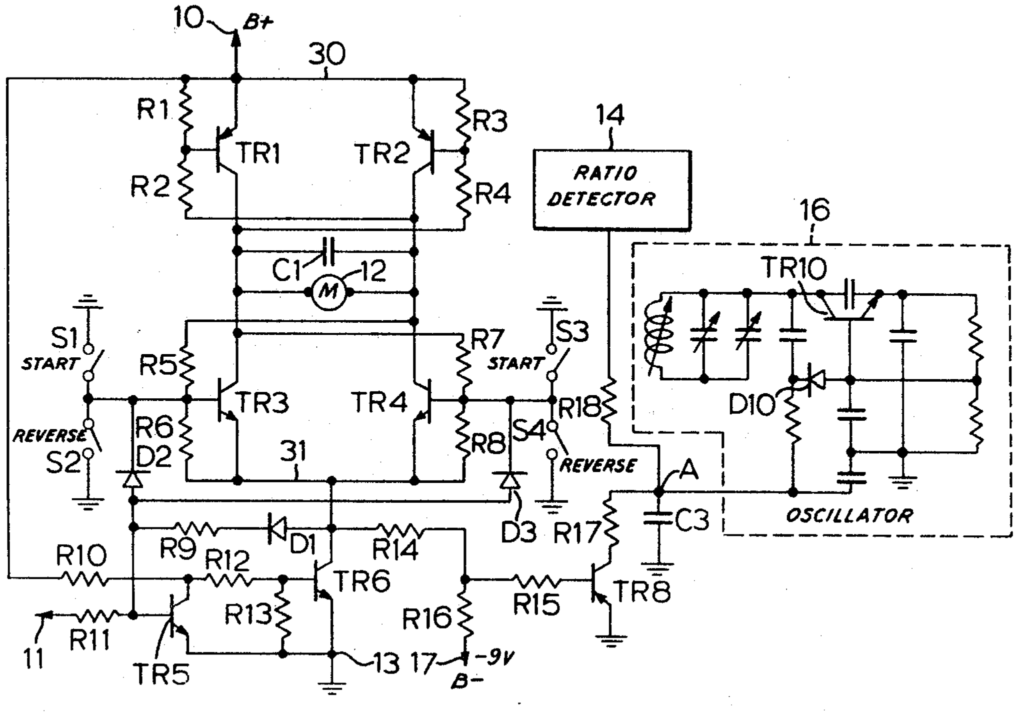

This invention will become more apparent from the following detailed description, taken in conjunction with the appended drawings, in which FIGURES 1 and 2 are block and circuit diagrams respectively illustrating a signal seeking receiver embodying this invention.

Referring to FIGURE 1, there is illustrated in block form certain components of a signal seeking receiver. These components consist of a motor reversing network 50, a motor switching network 60, an A.F.C. defeat network 70 and a motor 12. Motor 12 is drivingly connected to the tuning capacitor of the receiver, whereby, upon operation of the motor, the tuning of the receiver may be varied.

Motor reversing network 50 is shown in greater detail in FIGURE 2, to which reference now is made. The motor reversing network which is illustrated in FIGURE 2 is exemplary only, and those skilled in the art will realize that many different types of motor reversing networks could be used in the practise of this invention. In fact, a motor reversng network is not essential to this invention. In this respect, after the tuning condenser of the receiver has been fully rotated in one direction by motor 12, it could be returned manually to its original position. Motor reversing network 50 includes four transistors; TR1, TR2, TR3, TR4. A source of positive D.C. potential, i.e., a D.C. power supply (B+), is connected to a terminal 10 which, in turn, is connected to a conductor 30. The emitter electrodes of transistors TR1 and TR2 each are connected to conductor 30. Resistors R1 and R3 are connected between conductor 30 and the base electrodes of transistors TR1 and TR2 respectively. A resistor R2 is connected between the base electrode of transistor TR1 and the collecter electrode of transistor TR2, while a resistor R4 is connected between the base electrode of transistor TR2 and the collector electrode of transistor TR1. A capacitor C1 is connected between the collector electrodes of transistors TR1 and TR2. Motor 12 also is connected between the collector electrodes of transistors TR1 and TR2. It is assumed that motor 12 is of a type having a permanent magnet field, in which event the armature of motor 12 will be connected as shown in FIGURE 2. However, if motor 12 should have an electromagnetic field, the field coils could be connected between the collector electrodes of transistors TR1 and TR2 with the armature of the motor then being supplied from some other source. Regardless of which arrangement is employed, a reversal in the direction of the current passing through motor 12 will cause a corresponding reversal in the direction of rotation of the motor. The collector electrodes of transistors TR1 and TR3 are connected together, as are the collector electrodes of the transistors TR2 and TR4. The emitter electrodes of transistors TR3 and TR4 are connected by a conductor 31. Resistors R6 and R8 are connected between the base and emitter electrodes of transistors TR3 and TR4 respectively. A resistor R5 is connected between the collector electrode of transistor TR4 and the base electrode of transistor TR3, while a resistor R7 is connected between the collector electrode of transistor TR3 and the base electrode of transistor TR4. The motor reversing network also includes start switches S1 and S3 and reverse switches S2 and S4. Switches S1 and S2 are connected in parallel with each other between the base electrode of transistor TR3 and a terminal at a reference potential, namely ground potential. Switches S3 and S4 also are connected in parallel with each other but between the base electrode of transistor TR4 and ground.

Motor switching or automatic shut-off network 60 includes two transistors TR5 and TR6, these transistors being so connected that when one is turned on, the other is kept turned off, and vice versa until the state of conduction of the former transistor changes. The collector electrode of transistor TR6 is connected via a diode D1 and a resistor R9 to the base electrode of transistor TR5. The collector electrode of transistor TR5 is connected to the base electrode of transistor TR6 by means of a resistor R12. A resistor R13 is connected in voltage divider relationship with resistor R12, resistor R13 being connected between the base electrode of transistor TR6 and a terminal at a reference potential, namely ground potential. The emitter electrodes of transistors TR5 and TR6 both are grounded. Other types of automatic shut-off networks may be employed without departing from this invention.

As will become more apparent hereinafter, the collector and emitter electrodes of transistor TR6 are connected in a circuit through which the current (armature or field current) required to operate motor 12 must pass. Consequently, motor 12 only can operate if transistor TR6 is turned on. It is to be understood, however, that it is not essential to this invention that either the field or armature current of motor 12 pass through transistor TR6 when this transistor is turned on. All that is required is that a current required for the motor to operate pass through transistor TR6 when it is turned on. For example, this current may flow through the coil of a relay having its contacts in the field or armature circuit of motor 12.

A resistor R10 is connected between B+ and the collector electrode of transistor TR5.

Diodes D2 and D3 are connected between the base electrode of transistor TR5 and the base electrodes of transistor TR3 and TR4 respectively.

A terminal 11 is connected to the base electrode of transistor TR5 by a resistor R11. Terminal 11 may be connected to the ratio detector 14 of the receiver or to some other component of the receiver which provides a D.C. signal when the receiver is tuned to the frequency of a signal being received by the receiver.

A conventional A.F.C. network consisting of ratio detector 14, which provides an A.F.C. signal, a resistor R18, a filter capacitor C3 and an oscillator 16 including a transistor TR10 and a frequency determining component in the form of a variable capacitance diode D10 is shown in FIGURE 2. Resistor R18 and capacitor C3 are connected in series circuit between the centre point of ratio detector 14 and a terminal at a reference potential, namely ground potential. Point A, i.e., the common terminal of resistor R18 and capacitor C3 is connected to diode D10. More specifically, diode D10 is connected in a circuit that shunts capacitor C3.

A.F.C. defeat network 70 includes a transistor TR8 that is of opposite conductivity type to the conductivity type of transistor TR6. The emitter electrode of transistor TR8 is grounded. A resistor R17 and the collector and emitter electrodes of transistor TR8 are connected in a circuit across capacitor C3. A terminal 17 is connected to a negative D.C. power supply (B−), and the potential at terminal 17 may be −9 volts, for example. Biasing voltage for transistor TR8 to turn this transistor on is supplied from B− to the base electrode of transistor TR8 via resistors R16 and R15, the latter resistors being connected in series circuit with each other between terminal 17 and the base electrode of transistor TR8.

Connected between the collector electrode of transistor TR6 and the common terminal of resistors R15 and R16 is a resistor R14 which provides a path whereby an overriding bias voltage is supplied to the base electrode of transistor TR8 to turn this transistor off when transistors TR6 is turned off and motor 12 is not operating.

The operation of the circuit hereinbefore described now will be discussed.

With switches S1–S4 open, when a positive D.C. potential, B+, which may be 10–12 volts, for example, if applied to terminal 10, transistor TR5 will be biased on, regardless of whether or not there is an input signal present at input terminal 11. With transistor TR5 turned on, transistor TR6 will be kept off, and, as will become more apparent hereinafter, since transistor TR6 must be turned on before motor 12 can start, motor 12 will not operate.

Two paths are provided for the current required to turn on transistor TR5. One path is from terminal 10 via resistors R1, R2, R5 and R6, diode D1 and resistor R9 to the base electrode of transistor TR5. The other path is from terminal 10 via resistors R3, R4, R7 and R8, diode D1 and resistor R9 to the base electrode of transistors TR5. Diode D1 provides a low impedance path for the turn on current which ensures that transistors TR5 will turn on before transistor TR6 when B+ is applied to terminal 10. It will be appreciated that if transistor TR5 were not turned on before transistor TR6, transistor TR6 would be turned on due to current flowing from terminal 10 to terminal 13 via resistors R10, R12 and R13. This would result in transistor TR5 losing its control function.

Diode D1 presents a high impedance to any positive D.C. signal applied to input terminal 11, by virtue of which excessive loading of this signal is eliminated.

In order to start motor 12, it is necesary to close momentarily either start switch S1 or S3. Assume that start switch S1 is closed momentarily. When switch S1 is closed, diode D2 will establish a low impedance path between the base electrode of transistor TR5 and ground, and the relatively high voltage which, prior to closing of switch S1, had been applied to the base electrode of transistor TR5 and which kept this transistor turned on, immediately will decrease to the relatively small voltage drop across diode D2. Transistors TR5 then will turn off, with the result that the voltage at its collector electrode will rise. The relatively high voltage at the collector electrode of transistor TR5 will be applied to the base electrode of transistor TR6 via the voltage divider network consisting of resistors R12 and R13, and, whereas when transistor TR5 was turned on and its collector voltage was relatively low, thereby holding transistor TR6 off, now transistor TR6 will turn on because of the increase in the voltage which will be applied to its base electrode when transistor TR5 is turned off. The voltage at the collector electrode of transistor TR6 will drop as soon as this transistor turns on, and this relatively low voltage will be applied to the base electrode of transistor TR5 via diode D1 and resistor R9, thereby keeping transistor TR5 turned off. The voltage at the collector electrode of transistor TR6 when it is turned on is dependent on the saturation voltage of the transistor and typically may be of the order of +0.2 to +0.3 volt. The same sequence of events as outlined hereinbefore would result from the closing of switch S3.

It will be seen from the foregoing that transistors TR5 and TR6 are interconnected in such a manner that when one is on the other is kept off and vice versa until the state of conduction of the former transistor changes.

The closing of switch S1 short circuits, i.e., grounds the base electrode of transistor TR3, so that transistor TR3 can not conduct and its emitter-collector junction will present a high impedance. However, sufficient current will flow from terminal 10 to terminal 13 through the circuit consisting of resistors R3, R4, R7 and R8 and transistor TR6 to turn on transistor TR4. When transistor TR4 is turned on, its emitter-collector junction will present a low impedance, and current then can flow from terminal 10 to terminal 13 via the circuit consisting of resistors R1 and R2 and transistors TR4 and TR6. Transistor TR1 then will turn on. The low voltage drop across transistor TR1 (emitter-collector drop) when transistor TR1 conducts will keep transistor TR2 turned off. Similarly the low voltage drop across the collector-emitter junction of transistor TR4 will keep transistor TR3 turned off. Thus, transistors TR2 and TR3 will be turned off, while transistors TR1 and TR4 will be turned on even after switch S1 is re-opened. Under these conditions, current will flow from terminal 10 to terminal 13 via the circuit consisting of transistor TR1, motor 12, transistor TR4 and transistor TR6, by virtue of which motor 12 will run in one direction and change the setting of the tuning capacitor of the radio receiver. Capacitor C1 has the effect of preventing transistors TR1 and TR2 from oscillating.

Motor 12 will continue to run until a station is tuned in. When a station is tuned in, an input signal in the form of a D.C. voltage will appear at input terminal 11, this signal being derived from the ratio detector, for example, of the receiver, and will turn on transistor TR5, provided that the signal at terminal 11 is above a minimum predetermined signal strength. Transistor TR6 then will turn off, and since motor current must flow through the collector-emitter path of transistor TR6, motor 12 will turn off.

It will be appreciated that if switch S3 had been closed momentarily rather than switch S1, this would initiate a sequence of events leading to the turn on of transistors TR2 and TR3, which, in turn, would keep transistors TR1 and TR4 turned off, and which would result in rotation of motor 12 in a direction opposite to the direction of rotation resulting from the closing of switch S1.

Reversing switches S2 and S4 will be closed momentarily when the tuning gang reaches the limit of its travel in either direction, and the closing of these switches will result in an automatic change in the direction of rotation of motor 12.

A more detailed description of the operation of the network consisting of motor 12 and transistors TR1–TR4 and their associated components will be found in copending Canadian patent application Ser. No. 953,605, filed Mar. 2, 1966—Networks for Controlling the Direction of Rotation of a Direct Current Motor—Jacob Buhr (corresponding to United States patent application Ser. No. 531,518, filed Mar. 3, 1966), the disclosure of which is incorporated herein by reference. Other types of motor reversing networks which may be used in the practise of this invention also are disclosed therein.

From the foregoing it will be seen that a network consisting of transistors TR5 and TR6 and their associated components and switches S1–S4 is provided to control the operation of motor 12. This network is so designed that one of the switches must be closed to initiate motor operation, and operation of the motor will be stopped automatically when the receiver tunes in on a station.

The operation of the A.F.C. defeat network now will be discussed. As aforementioned, while motor 12 is running and a signal is being sought, it is desirable to render the A.F.C. circuit of the receiver inoperative, since this permits closer tuning to be obtained than if the A.F.C. remained operative. Of course, as soon as a station is tuned in, the A.F.C. circuit must be made operative again to avoid drift.

One terminal of resistor R18 is connected to the center point of ratio detector 14. Consequently, when a station is tuned in exactly, the voltage at this terminal of resistor R18 will be zero, but if the receiver is tuned to above or below the exact frequency of the station, a positive or negative voltage respectively will be developed at this terminal. The signal applied to resistor R18 need not necessarily be derived from a ratio detector, although this probably is the most convenient source for the A.F.C. signal. All that is required is that resistor R18 be supplied with a D.C. signal that indicates both the degree and direction of mistuning.

When transistor TR6 is on and motor 12 running, the voltage at the collector electrode of transistor TR6 will be relatively low, say of the order of +0.2 to +0.3 volt. Consequently the negative supply voltage, −9 volts, connected to terminal 17 will turn on transistor TR8. Under these circumstances, the impedance presented by transistor TR8 to negative voltages at the junction of resistor R18 and capacitor C3 will be low, and capacitor C3 will be essentially short circuited, i.e., the voltage at point A will be essentially ground potential, so the A.F.C. signal will be substantially short circuited. Similarly, the impedance presented by transistor TR8 to positive voltages at point A also will be low, although not as low as it would be for negative voltages. However, by appropriate selection of resistor R18, which may be 220KΩ, as compared to 10KΩ for resistor R17, capacitor C3 will be essentially short circuited for positive voltages at point A, and the voltage at point A will be essentially ground potential. Thus, as long as motor 12 is running, the potential at point A will remain substantially the same, i.e., substantially ground potential. Since the base electrode of transistor TR10 is held at a fixed voltage, and since the voltage at point A also is essentially fixed during running of motor 12, the voltage across variable capacitance diode D10 will remain substantially constant, and A.F.C. will be effectively defeated.

When transistor TR6 is turned off, i.e., when a station is tuned in, motor 12 will stop running, as aforementioned, and the voltage at the collector electrode of transistor TR6 will rise, to say +10 volts or more. In any event, there will be a sufficient increase in voltage to override the negative supply voltage at terminal 17 and turn off transistor TR8. Transistor TR8 then will present a high impedance to positive and negative voltages at point A, and normal A.F.C. will resume with variations in the potential at point A causing changes in the capacitance of diode D10, which will result in changes in the frequency of oscillations of oscillator 16 in a direction to compensate for the frequency deviation that caused the correction.

The impedance of the circuit consisting of resistor R17 and the collector and emitter electrodes of transistor TR8 should be low (relative to the impedance of resistor R18) when transistor TR8 is turned on and high when transistor TR8 is turned off.

It is to be understood that it is not essential that transistor TR8 be biased off from transistor TR6 when motor 12 is not operating, although this is definitely preferred. In general, transistor TR8 could be connected to any transistor that is on when motor 12 is running and off when the receiver is turned to the frequency of a signal being received by the receiver and of a strength greater than a minimum predetermined signal strength, provided that when this transistor is off, it will keep transistor TR8 turned off.

While preferred embodiments of this invention have been disclosed herein, those skilled in the art will appreciate that changes and modifications may be made therein without departing from the spirit and scope of this invention as defined in the appended claims.

I claim:

1. In a signal seeking receiver of a type having an A.F.C. network including means for providing an A.F.C. signal, a terminal at which said A.F.C. signal appears, a local oscillator including a frequency determining component, and means connecting said terminal and said frequency determining component for supplying said A.F.C. signal to said frequency determining component to vary the impedance thereof and hence the frequency of oscillation of said local oscillator; variable tuning means for varying the tuning of said receiver; a motor drivingly connected to said tuning means, whereby the tuning of said receiver can be changed by operation of said motor; a first transistor having base, collector and emitter electrodes, and means for automatically turning said first transistor off when said receiver is turned to the frequency of a signal being received by said receiver and of a strength greater than a minimum predetermined signal strength and on during signal seeking;

(a) an A.F.C. defeat network for automatically rendering said A.F.C. network inoperative when said first transistor is turned on, said A.F.C. defeat network comprising a second transistor having base, collector and emitter electrodes, means connecting said collector and emitter electrodes of said second transistor in a first circuit adapted to substantially short circuit said A.F.C. signal when said second transistor is turned on, and means for supplying a first bias voltage to said second transistor to turn on said second transistor; and (b) means interconnecting said first and second transistors for supplying a second bias voltage to said second transistor when said first transistor is turned off, said second bias voltage being sufficient to override said first bias voltage and turn off said second transistor; the D.C. impedance of said first circuit being sufficiently low when said second transistor is turned on that said A.F.C. signal is substantially short circuited said first circuit being of substantially higher D.C. impedance when said second transistor is turned off.

2. The invention according to claim 1 wherein said receiver includes an automatic shut-off network for automatically turning off said motor when said receiver is tuned to the frequency of a signal being received by the receiver and of a strength greater than a minimum predetermined signal strength, said automatic shut-off network including said first transistor.

3. The invention according to claim 2 wherein said collector and emitter electrodes of said first transistor are connected in a second circuit through which current required in order for said motor to operate must pass, whereby when said first transistor is turned off said current is unable to flow through said second circuit and said motor ceases operating.

4. The invention according to claim 3 wherein said transistors are of opposite conductivity types.

5. The invention according to claim 4 wherein said A.F.C. network includes a resistor and a capacitor, said resistor being connected between said terminal and said means for providing said A.F.C. signal, said capacitor being connected in a third circuit shunting said frequency determining component as well as said first circuit, said resistor being connected between said means for providing said A.F.C. signal and both said first and third circuits, the impedance of said first circuit being low when said second transistor is turned on and high when said second transistor is turned off.

6. The invention according to claim 5 wherein said capacitor is connected between said terminal and a terminal at a reference potential.

7. The invention according to claim 4 wherein said means interconnecting said first and second transistors are connected between said collector electrode of said first transistor and said base electrode of said second transistor.

8. The invention according to claim 7 wherein said means interconnecting said first and second transistors include at least one resistor.

9. The invention according to claim 6 wherein said means interconnecting said first and second transistors include at least one resistor connected between said collector electrode of said first transistor and said base electrode of said second transistor.

10. The invention according to claim 9 wherein said means for supplying said first bias voltage include a D.C. power supply and at least one resistor connected between said D.C. power supply and said base electrode of said second transistor.

References Cited

UNITED STATES PATENTS

| | | |
|---|---|---|
| 2,915,625 | 12/1959 | Worcester. |
| 3,328,700 | 6/1967 | Chipman. |
| 3,308,382 | 3/1967 | Vo Dinh Hien. |

KATHLEEN H. CLAFFY, Primary Examiner

B. P. SMITH, Assistant Examiner

U.S. Cl. X.R.

325—418, 420, 457, 470